United States Patent
Johanson et al.

(10) Patent No.: US 8,967,664 B2
(45) Date of Patent: Mar. 3, 2015

(54) ADAPTIVE GAS GENERATOR FOR AIRBAG

(71) Applicant: Autoliv Development AB, Vargarda (SE)

(72) Inventors: Mats Johanson, Fristad (SE); Tobias Aderum, Göteborg (SE)

(73) Assignee: Autoliv Development AB, Vargarda (SE)

( * ) Notice: Subject to any disclaimer, the term of this patent is extended or adjusted under 35 U.S.C. 154(b) by 14 days.

(21) Appl. No.: 14/096,113

(22) Filed: Dec. 4, 2013

(65) Prior Publication Data

US 2014/0151988 A1 Jun. 5, 2014

(30) Foreign Application Priority Data

Dec. 4, 2012 (FR) ..................................... 12 03289

(51) Int. Cl.
| | | |
|---|---|---|
| *B60R 21/26* | (2011.01) | |
| *B60R 21/264* | (2006.01) | |
| *B60R 21/268* | (2011.01) | |
| *C06D 5/00* | (2006.01) | |
| *B60R 21/274* | (2011.01) | |
| *B60R 21/2338* | (2011.01) | |

(52) U.S. Cl.
CPC ................ *B60R 21/268* (2013.01); *C06D 5/00* (2013.01); *B60R 21/274* (2013.01); *B60R 2021/26076* (2013.01); *B60R 2021/23384* (2013.01); *B60R 2021/26058* (2013.01)
USPC ............................ 280/736; 280/740; 280/742

(58) Field of Classification Search
USPC .......... 280/736, 737, 738, 739, 740, 741, 742
See application file for complete search history.

(56) References Cited

U.S. PATENT DOCUMENTS

| | | | | |
|---|---|---|---|---|
| 5,366,242 | A * | 11/1994 | Faigle et al. ................... | 280/736 |
| 6,039,346 | A * | 3/2000 | Ryan et al. ..................... | 280/736 |
| 6,213,502 | B1 * | 4/2001 | Ryan et al. ..................... | 280/736 |
| 6,439,603 | B2 * | 8/2002 | Damman et al. ............... | 280/736 |
| 6,572,140 | B2 * | 6/2003 | Specht et al. .................. | 280/736 |
| 6,669,231 | B2 * | 12/2003 | Ryan .............................. | 280/736 |
| 6,918,614 | B2 * | 7/2005 | Ryan .......................... | 280/743.2 |
| 7,083,192 | B2 * | 8/2006 | Fischer et al. ................. | 280/739 |

(Continued)

FOREIGN PATENT DOCUMENTS

| | | |
|---|---|---|
| DE | 102005008356 A1 | 8/2006 |
| DE | 102006041703 A1 | 3/2008 |

(Continued)

OTHER PUBLICATIONS

Search Report and Written Opinion regarding French Application No. 1203289, dated Aug. 12, 2013.

*Primary Examiner* — Paul N Dickson
*Assistant Examiner* — Barry Gooden, Jr.
(74) *Attorney, Agent, or Firm* — Harness, Dickey & Pierce, P.L.C.

(57) ABSTRACT

A gas generator for a protective airbag includes at least one pressurized gas chamber, a first actuator arranged so as to open the pressurized gas chamber, and a diffusion chamber including at least one diffusion hole defining a communication surface. Outside the diffusion chamber, the gas generator includes an obturator having a second actuator. The obturator is arranged in a first position in which it defines a first diffusion surface. The second actuator is arranged so as to allow it to go into a second position in which it defines a second diffusion surface.

15 Claims, 5 Drawing Sheets

(56) References Cited

U.S. PATENT DOCUMENTS

| | | | |
|---|---|---|---|
| 7,401,809 B2 * | 7/2008 | Lube | 280/739 |
| 7,431,336 B2 * | 10/2008 | Karlow et al. | 280/739 |
| 7,641,230 B2 * | 1/2010 | Schramm et al. | 280/736 |
| 7,938,443 B1 * | 5/2011 | Smith | 280/736 |
| 8,136,836 B2 * | 3/2012 | Schreiber et al. | 280/741 |
| 8,662,532 B2 * | 3/2014 | Parks et al. | 280/736 |
| 2001/0045734 A1 * | 11/2001 | Damman et al. | 280/736 |
| 2003/0178827 A1 * | 9/2003 | Dinsdale et al. | 280/736 |
| 2006/0249938 A1 * | 11/2006 | Matsuda et al. | 280/736 |
| 2009/0108573 A1 * | 4/2009 | Schramm | 280/740 |
| 2010/0283231 A1 * | 11/2010 | Johanson et al. | 280/735 |
| 2012/0112442 A1 * | 5/2012 | Parks et al. | 280/741 |

FOREIGN PATENT DOCUMENTS

| | | |
|---|---|---|
| WO | 03002382 A1 | 1/2003 |
| WO | 2009090356 A1 | 7/2009 |

\* cited by examiner

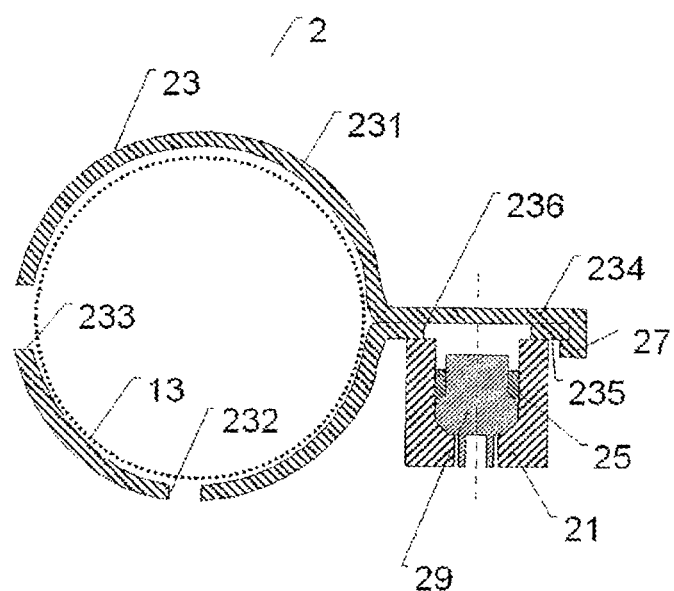
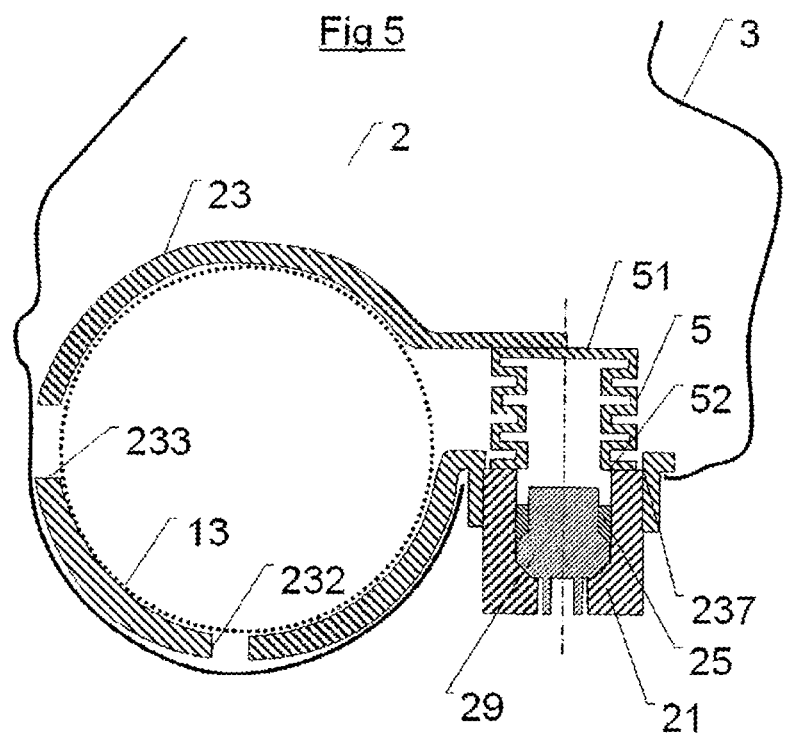

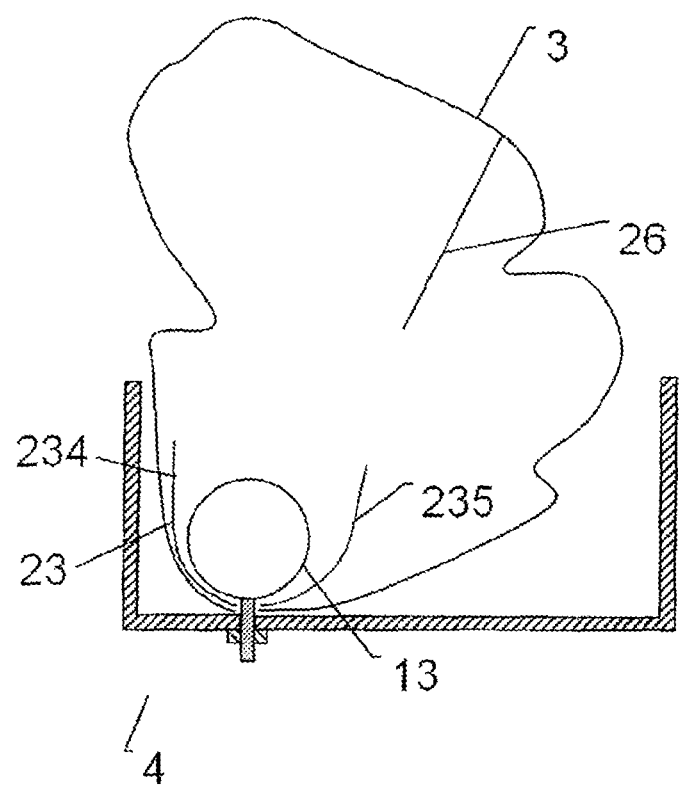

ADAPTIVE GAS GENERATOR FOR AIRBAG

CROSS-REFERENCE TO RELATED APPLICATIONS

This application claims the benefit and priority of French Application No. 12/03289 filed 4 Dec. 2012. The entire disclosure of the above application is incorporated herein by reference.

FIELD

The present invention generally relates to an adaptive gas generator for inflating an airbag generally mounted on a vehicle.

BACKGROUND

This section provides background information related to the present disclosure which is not necessarily prior art.

The present invention relates to an adaptive gas generator for inflating an airbag generally mounted on a vehicle.

SUMMARY

This section provides a general summary of the disclosure and is not a comprehensive disclosure of its full scope or all of its features.

Adaptive devices including pressurized gas chambers are known from the prior art, such as document WO2009090356. The disclosed generator comprises two pressurized gas chambers closed with different lids and between which is attached a diffusion chamber. Inside the latter two pyrotechnic devices are positioned, arranged so as to open the lids so as to release more or less rapidly the gas stored in the generator, giving the generator an adaptive function. This device is difficult to assemble, is bulky and therefore difficult to apply in a generator of small diameter. It includes many complicated components and is therefore expensive to manufacture. Further, the lids are opened by the pressure of the remaining gases in the gas chambers when a support of the lids is withdrawn following activation of the pyrotechnic devices. Thus, depending on the remaining pressure in the gas chambers at the moment when the second pyrotechnic device is fired, the lids which are not yet open, may open more or less rapidly which may generate variations in performances.

An object of the present invention is to provide an answer to the drawbacks of the prior art mentioned above and in particular to propose an adaptive generator at a lesser cost, with simple, robust and reproducible operation, with not many complex internal components.

For this, a first aspect of the invention relates to a gas generator for an airbag including:

at least one pressurized gas chamber;

a first actuator arranged for opening said pressurized gas chamber;

a diffusion chamber including a communication surface arranged for being able to diffuse the gases from said at least one pressurized gas chamber towards the airbag;

characterized in that it further comprises outside the diffusion chamber, an obturator comprising a second actuator, the obturator being arranged so as to be locked in a first position in which, in cooperation with the communication surface, it defines a first diffusion surface, the second actuator being arranged for unlocking the obturator so as to allow it to go into the second position in which it defines, in cooperation with the communication surface, a second diffusion surface area greater than the first diffusion surface area.

Said at least one gas chamber being opened by a single actuator and the obturator being distinct and positioned outside the diffusion chamber, this adapted gas generator:

may use the quasi-totality of the components of a non-adaptive gas generator of same design, which allows reduction in the development, manufacturing and assembling costs of such an adaptive gas generator;

has an operation which is more repeatable than the one proposed by the prior art insofar that one proceeds ignoring the conditions of pressure internal to the gas generator for applying the adaptive function of the generator.

The positioning of the obturator outside the diffusion chamber frees space inside the generator, the latter may therefore be proposed with a smaller diameter. Further, the obturator outside the diffusion chamber will be located in an area of low pressure, which avoids having to provide resistance of the obturator to strong pressures. Finally, as the obturator during its displacement frees at least one portion of the communication surface, its movement is facilitated by the flow of the gases diffused towards the airbag.

According to an embodiment, the second diffusion surface area is equal to the communication surface area.

According to an embodiment, the second diffusion surface area is lower than the communication surface area.

According to an embodiment, the gas generator comprises a second pressurized gas chamber, the diffusion chamber is arranged between both pressurized gas chambers and the first actuator is arranged for opening both pressurized gas chambers.

Advantageously, this embodiment gives the possibility of making a gas generator adaptive, storing the totality of the gases in two pressurized gas chambers, which is advantageous when it is desired to store at least two reactive gases, while only having one actuator for opening the gas chambers. Further, as the obturator is arranged for partly obstructing the communication surface in the first position, this gives the possibility of improving the mixing of the reactive gases in the diffusion chamber and thus improving ignition of the mixture. Advantageously, in such an embodiment, the first gas reserve contains at least one oxidizing gas which may be oxygen and the second gas chamber contains at least one reducing gas which may be hydrogen.

According to an embodiment, the obturator comprises a deflector arranged for:

partly covering the communication surface when the obturator is in the first position; and moving away from the communication surface when the obturator passes into the second position by deforming, the obturator being made in a material with a predetermined ultimate strength and being arranged so that mechanical stresses generated in the obturator during this deformation do not exceed the ultimate strength of the material for making the obturator.

Advantageously, this embodiment avoids any risk of ejection of debris from the obturator into the airbag upon its passing from the first position to the second position, an ejection which may damage the airbag, require its reinforcement, or even injure an occupant of the vehicle. Moreover, the deflector allows deviation of the gases diffused by the communication surface and thus reduction in the aggressivity of the generator towards the safety bag and improvement in the kinematics of deployment of the safety bag by deviating the gases in a preferential direction favorable to the deployment.

According to an embodiment, the obturator, in the first position, is arranged for partly covering the communication surface and defining a first obturated surface, the first diffusion surface being the non-obturated communication surface: the communication surface area is equal to the first diffusion service area plus the first obturated surface area, and the obturator, in the second position, is arranged for reducing the obstruction of the communication surface and thereby defining a second obturated surface, the second diffusion surface area remaining the non-obturated communication surface area: the communication surface area being equal to the second diffusion surface area plus the second obturated surface area. It should be noted that the second obturated surface area may be zero if all the communication surface area is left free for diffusing gases towards the safety bag.

According to an embodiment, the deflector is arranged so as to be pushed by the gases diffused by the communication surface for passing from the first position to the second position.

Advantageously, this embodiment gives the possibility of limiting the power of the second actuator which only has the function of unlocking the obturator and thereby limiting the cost of the gas generator.

According to an embodiment, the second actuator is a pyrotechnic igniter.

Advantageously, this embodiment allows remote actuation of the activation of the obturator under the command from a computer integrated into the vehicle.

According to an embodiment, the second actuator is connected to the airbag.

Advantageously, this embodiment allows remote actuation of the activation of the obturator depending on the kinematics of deployment of the safety bag and thus gives the possibility of doing without any electric command, with which the overall cost of the system may be reduced. This embodiment further allows reduction in the aggressivity of the protective bag in the case when the occupant would be in an abnormal position also known to one skilled in the art under the term of « out of position » . In other words, the second actuator is a mechanical link between the airbag and the obturator, controlling the latter during the deployment of the bag by mechanical action such as traction. Alternatively, the breakable element may assume the shape of a seam or a pin which may be in plastic.

According to an embodiment, the second actuator is a pyrotechnic igniter and the pyrotechnic igniter is arranged for deforming the deflector from the first position to the second position.

Advantageously, this embodiment gives the possibility of more accurately controlling the second diffusion surface and thus improving the reproducibility of the operation of the generator.

According to an embodiment, the deflector has the shape of a strip laid out around the diffusion chamber and the ends of which are connected together in order to form a locking of the strip around the diffusion chamber.

Advantageously, this embodiment gives the possibility of applying simple and inexpensive components.

According to an embodiment, the obturator comprises a piston arranged for locking together the ends of the strip, attached to a first end of the strip, and arranged so as to be forcibly inserted into the second end. The piston according to this application is economical to make.

According to an embodiment, the second actuator is laid out in order to push the piston out of the second end.

Advantageously, the second actuator according to this application pushes the piston out of the second end of the strip, which has the effect of releasing the first end. Unlocking is therefore carried out concomitantly with the setting into motion of the obturator from the first towards the second position.

According to an embodiment, the deflector has the shape of a strip positioned around the diffusion chamber and the ends of the strip are connected together through a breakable element.

Advantageously, this embodiment gives the possibility of controlling the passage towards the second position by the material and the shape of the breakable element.

A second aspect of the invention is an automobile safety module including a gas generator according to the first aspect.

According to an embodiment, the module, the gas generator of which is provided with at least one attachment pin, comprises a casing and at least one nut arranged so as to attach the gas generator to the casing, and the obturator is kept in place by tightening the obturator between the gas generator and the casing.

Advantageously, this embodiment simplifies the assembling of the defector on the gas generator and guarantees its proper positioning in the safety module during the whole lifetime of the device.

A third aspect of the invention is an automobile vehicle including at least one gas generator according to the first aspect.

It is understood that the embodiments described above may be combined with each other in order to combine the various advantages thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 illustrates a section of an obturator according to a second embodiment and in its first locked position.

FIG. 5 illustrates a section of an obturator according to a third embodiment and in its first locked position.

FIG. 8 illustrates a section of an obturator according to a fourth embodiment and in its second position.

Corresponding reference numerals indicate corresponding parts throughout the several views of the drawings.

DETAILED DESCRIPTION

Example embodiments will now be described more fully with reference to the accompanying drawings.

Figure 1:
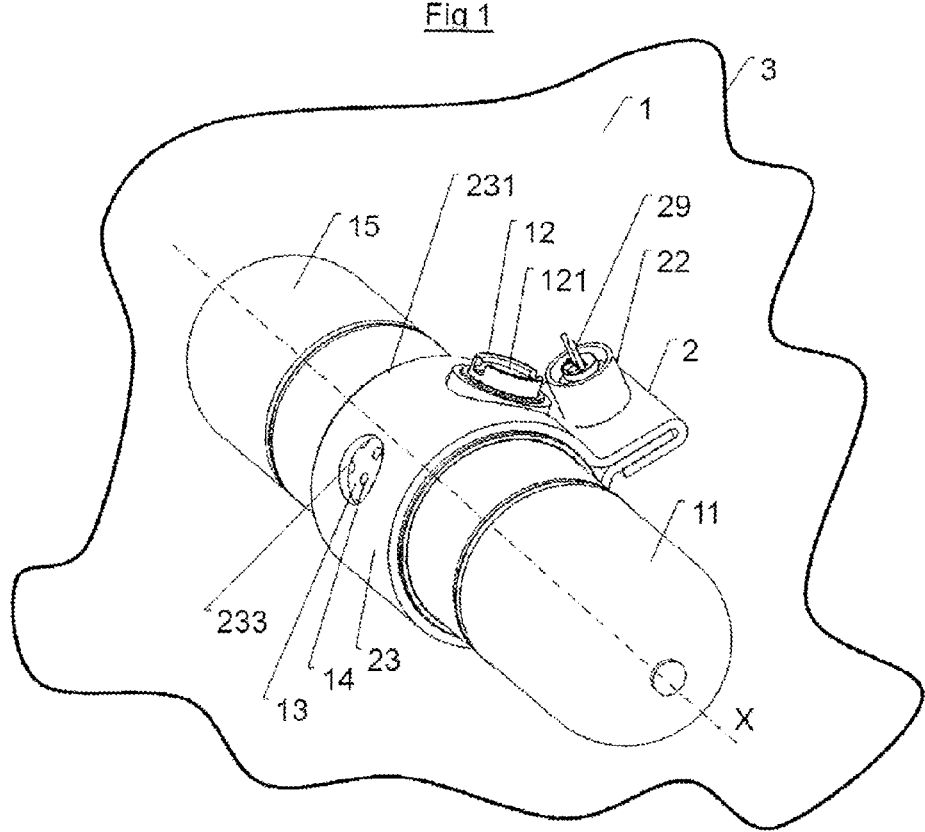
FIG. 1 is an isometric illustration of a gas generator including an obturator according to the invention in its first locked position.

FIG. 1 illustrates a gas generator 1 in a safety bag 3. The gas generator 1 comprises two gas pressurized gas chambers 11 and 15 between which a diffusion chamber 13 is laid out and comprises at least one diffusion hole 14. The surface of the diffusion hole 14 defines a communication surface which is arranged for diffusing the gases from the pressurized gas chambers 11 and 15 towards the airbag 3. The pressurized gas chambers 11 and 15 as well as the diffusion chamber 13 are of substantially cylindrical shapes of axis X. The gas generator 1 further comprises a first actuator 12 with the shape of a pyrotechnic igniter 121 attached by means of one or several structural elements, not shown for the sake of clarity, to the diffusion chamber 13. The pyrotechnic igniter 121 is arranged for opening the pressurized gas chambers 11 and 15. In alternatives not shown, the pyrotechnic igniter 121 may be attached to elements of the gas generator 1 other than the diffusion chamber 13, such as the pressurized gas chamber 11 or 15.

Figure 3:
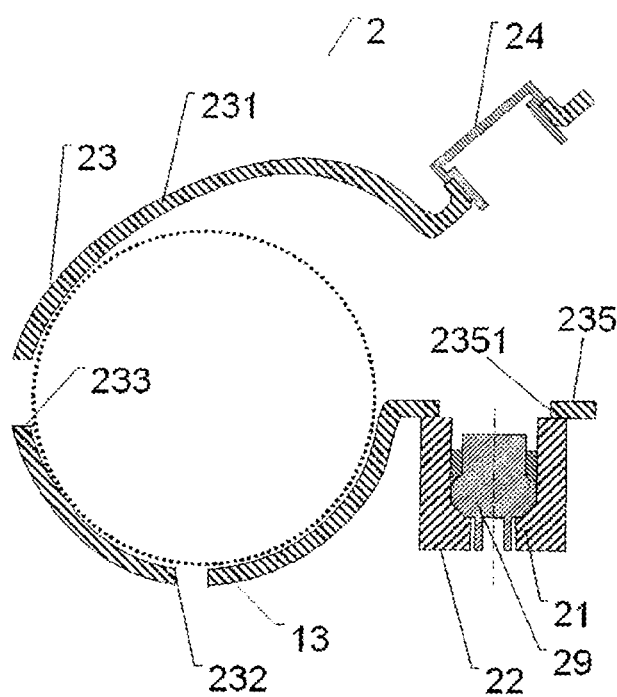
FIG. 3 illustrates a section of an obturator according to a first embodiment and in its second position.

The gas generator 1 is equipped, outside the diffusion chamber 13 with an obturator 2 provided with a second actuator 22 with the shape of a pyrotechnic igniter 29. The obturator 2 is arranged so as to be locked in a first position in which the obturator 2 partly obstructs the communication surface as illustrated in this FIG. 1. This gives the possibility of limiting the gas flow diffused by the diffusion chamber 13 by forming a screen in front of the communication surface formed by the diffusion holes 14. As illustrated in FIG. 3, the obturator 2 may be unlocked under the action of the second actuator 22 in order to pass into a second position in which the obstruction made by the obturator 2 in the first position is reduced. This has the consequence of allowing a gas flow to diffuse through the diffusion chamber 13 which is more substantial with the obturator 2 in the second position than in the first position. This thus makes the gas generator 1 adaptive, on a command from outside the gas generator 1.

In FIG. 1, the obturator 2 has the shape of a deflector 23 formed with a strip 231 which may for example be in metal with a thickness allowing it to withstand the gas flow diffused by the diffusion chamber 13, i.e. capable of limiting the gas flow diffused by the diffusion chamber 13 in this first operating position; any material other than the metal capable of withstanding the gas flow may be used for making the deflector 23, such as for example a fabric coated with an elastomer or a silicone or an injected element in elastomer such as EPDM. These latter materials have the advantage of not being aggressive towards the partly illustrated safety bag 3 and of being sufficiently flexible so as to deform during the folding of the safety bag 3.

In this FIG. 1, the deflector 23 covers the width of the diffusion chamber 13 and comprises an aperture 233 allowing diffusion of the gases when the obturator 2 is in the first position. The second actuator 22 assumes the shape of a pyrotechnic igniter 29 attached to the deflector 23 by crimping or clip-fastening for example.

Figure 2:
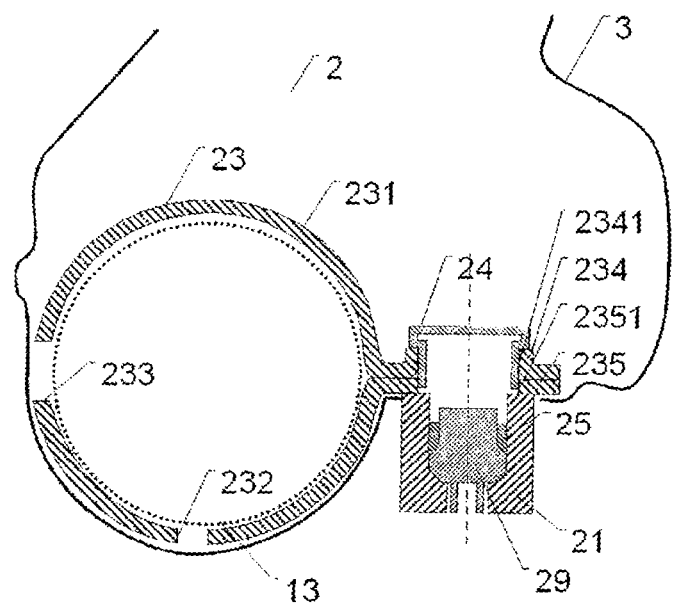
FIG. 2 illustrates a section of an obturator according to a first embodiment and in its first locked position.

FIG. 2 is a section of the obturator 2 along a plane perpendicular to the axis X of the gas generator 1 according to the first embodiment. The first actuator 12 is not illustrated in this figure for more clarity. The second actuator 22 is attached to the deflector 23 via an igniter support 21 in which it is maintained for example by a ring 25 which may be forcibly mounted. The igniter support 21 is for example attached to the deflector 23 through a weld.

The deflector 23 is wound around the diffusion chamber 13 symbolized by dotted lines. Both ends 234 and 235 of the deflector 23 are connected together through a piston 24. This piston 24 crosses the aperture 2341 of the upper end 234 and the aperture 2351 of the lower end 235. The piston 24 is for example force-fitted into the aperture 2351. The piston may also be force-fitted into the aperture 2341 with a fitting force greater than the fitting force in the aperture 2351 so that the piston 24 remains bound to the upper end 234 when the obturator 2 passes from the first position to the second operating position. This avoids ejection of any part inside the airbag 3 which may aggress the airbag 3 and/or the occupant of the vehicle.

During the firing of the pyrotechnic igniter 29, the generated gases cause an increase in the pressure in the piston 24 which generates separation of the piston 24 from the lower end 235. As both ends 234 and 235 are no longer connected, the deflector 23 opens as illustrated in FIG. 3 so as to have the obturator 2 pass from the first to the second operating position. Deformation of the deflector 23 is obtained under the effect of the gases generated by the pyrotechnic igniter 29 and/or under the action of the gases diffused by the diffuser 13.

The gas generator 1 may include a pin which may be used for attaching the deflector 23 between the gas generator 1 and the casing of an airbag by means of a nut.

FIG. 4 is a section of the obturator 2 according to a second embodiment and along the same sectional plane as the one of FIG. 2. The elements identical with those described in connection with the first embodiment of FIG. 2 bear identical numerical references and will not be described again in detail. The upper 234 and lower 235 ends are connected together through a portion of one of the upper 234 or lower 235 ends, plastically deformed so as to form a lock 27. For this, the upper end 234 is folded back onto the lower end 235 so as to cover it. In an alternative version not shown, the lower ends 235 may be folded back onto the upper end 234. In another alternative version, the lower 234 and upper 235 ends may be bound through a weld, for example a spot weld, in order to provide locking of both ends together.

In order that the firing of the pyrotechnic igniter may unlock the lock 27, the lower end 235 comprises an aperture 236 which allows the gases generated under pressure in the aperture 236 by the igniter to exert a thrust force on the upper end 234 and thus mechanically urge the lock 27 so as to separate the lower 235 and upper 234 ends.

Figure 6:
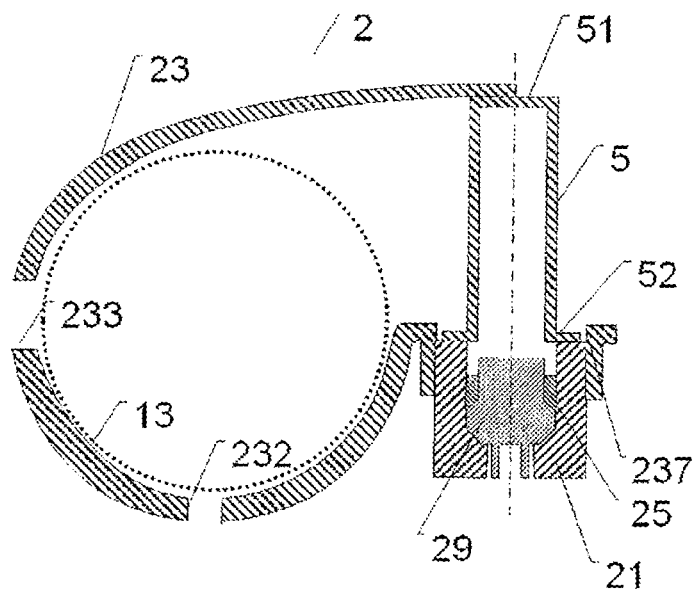
FIG. 6 illustrates a section of an obturator according to a third embodiment and in its second position.

FIGS. 5 and 6 illustrate a third embodiment in which the deformation of the deflector 23 is generated by the second actuator 22 which is a pyrotechnic igniter 29. In this embodiment, the igniter support 21 is bound to the deflector 23 through welding or crimping in an aperture 237 present in the lower end 235. The igniter support 21 is covered with a deformable sheath 5 forming a chamber, the first end 52 of which is bound to the igniter support 21 through welding or crimping. The deformable sheath 5 has the shape of a tube, the second end 51 of which is closed and the side wall of which is corrugated so that when the pressure increases inside the tube, the corrugations of the wall deform so that the side wall stretches and the second closed end 51 then moves away from the first end 52 of the tube. The upper end 234 of the deflector 23 formed with a strip 231 is bound to the end 51 of the deformable sheath 5 by welding or crimping. The deformable sheath 5 may at least temporarily contain the gases generated by the firing of the pyrotechnic igniter 29; the pressure increase inside the deformable sheath 21 causes displacement of the end 51 and of the connection between the upper end 234 of the deflector 23 and the deformable sheath 5 as illustrated in FIG. 6. This embodiment gives the possibility of avoiding that the gases generated by the pyrotechnic igniter 29 come into contact with the airbag 3 and ensures deformation and/or a controlled aperture length of the deflector 23 neither dependent on or influenced by the gases diffused by the diffusion chamber 13.

Figure 7:
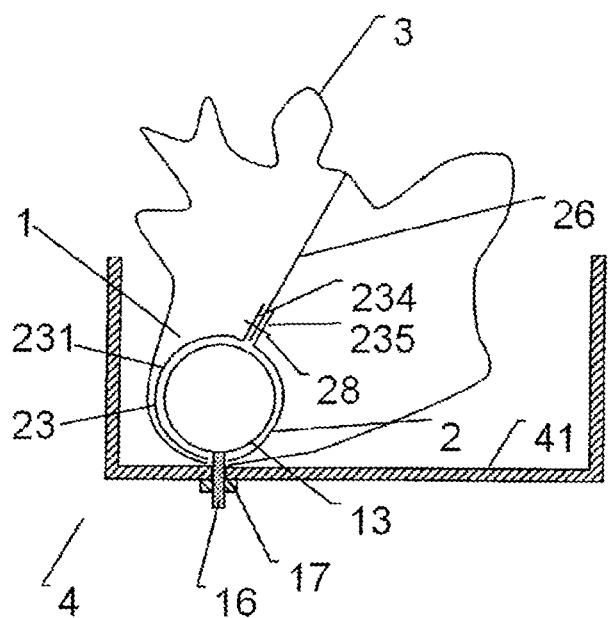
FIG. 7 illustrates a section of an obturator according to a fourth embodiment and in its first locked position.

FIGS. 7 and 8 illustrate a fourth embodiment in which the second actuator 26 is connected to the protective airbag 3. These figures illustrate sections of a safety module 4 along a plane perpendicular to the axis X of the gas generator 1 illustrated in FIG. 1. In this embodiment, the second actuator 26 has the shape of a flexible connection capable of being folded at the same time as the airbag 3. A first end of the actuator 26 is sewn on the airbag 3 to a bag anchoring area and the second end is connected to the deflector 23 at a deflector anchoring area. The length of the second actuator 26 is defined so that it is shorter than the distance between the bag anchoring area and the deflector anchoring area when the protective airbag 3 is deployed. The deflector 23 is formed with a strip 231 of fabric coated with an elastomer or silicone. Alternatively, the deflector 23 may be an injected part, for example in elastomer, for example an EPDM. The second end of the actuator 26 is connected to the deflector 23 through a seam 28 which also gives the possibility of locking together the upper 234 and lower 235 ends of the deflector 23 around the diffusion chamber 23. For this, the second actuator 26 is for example sewn between the upper 234 and lower 235 ends of the deflector 23. The seam 28 is defined so that it is capable of withstanding the gases diffused by the diffusion chamber 23 but may break during the deployment of the safety bag 3 when the force generated by the tension of the second actuator 26 on the seam 28 exceeds a predetermined breakage value of the seam 28. The seam 28 is broken:

it no longer maintains together both upper 234 and lower 235 ends of the deflector 23 which may open under the effect of the gases diffused by the diffusion chamber 23;

the safety bag 3 is no longer connected to the deflector 23 through the second actuator 26 and may therefore be completely deployed as illustrated in FIG. 8.

In this fourth embodiment, the length of the actuator 26 gives the possibility of adjusting the moment of time at which the obturator 2 will pass into the second operating position, and this without any electric signal. This embodiment further gives the possibility of making sure that the gas flow delivered by the gas generator 1 will not be greater than the flow rate allowed by the obturator 2 in its first operating position even if an outer element such as the head of an occupant opposes the deployment of the safety airbag 3.

Alternatively, the seam 28 may be replaced with a pin for example in plastic which also allows the locking together of the upper 234 and lower 235 ends of the deflector 23 around the diffusion chamber 23. For this, the pin comprises a shoulder on the side of the upper end 234 and is folded back on the side of the lower end 235, for example by ultrasonic welding. The pin is defined so that it withstands the gases diffused by the diffusion chamber 23 but breaks during deployment of the safety bag 3 when the force generated by the tension of the second actuator 26 on the pin exceeds the breakage value of the pin.

According to FIG. 7, the deflector 23 is crossed by an aperture 232 which may be used for letting through a pin 16 bound to the gas generator 1. This pin 16 thus crossing the casing 41 allows the obturator 2 to be bound between the gas generator 1 and the casing 41 via a nut 17 tightened on the casing 41. This allows efficient positioning and at a lesser cost of the obturator 2 on the gas generator 1.

It will be understood that diverse modifications and/or improvements obvious to one skilled in the art may be made to the different embodiments of the invention described in the present description without departing from the scope of the invention as defined by the appended claims.

In particular, the attachment of the second actuator 22 to other elements of the protective module 4 may be contemplated insofar that it may unlock the obturator 2 for having it pass from the first position to the second operating position.

What is claimed is:

1. A gas generator for an airbag comprising:
    at least one pressurized gas chamber;
    a first actuator for opening the at least one gas pressurized gas chamber;
    a diffusion chamber including a communication surface arranged for diffusing gases from the at least one pressurized gas chamber towards the airbag; and
    an obturator located outside the diffusion chamber and including a second actuator, the obturator arranged so as to be locked in a first position in which the obturator and the communication surface cooperate to define a first diffusion surface area;
    wherein the second actuator is arranged for unlocking the obturator in order to allow the obturator to go into a second position in which the obturator and the communication surface cooperate to define a second diffusion surface area greater than the first diffusion surface area;
    wherein the obturator includes a deflector partly covering the communication surface when the obturator is in the first position, and moving away from the communication surface when the obturator passes into the second position by deforming.

2. The gas generator according to claim 1, wherein the second diffusion surface area is lower than the communication surface.

3. The gas generator according to claim 1, wherein the second diffusion surface area is equal to the communication surface.

4. The gas generator according to claim 1, wherein the at least one pressurized gas chamber includes a first pressurized gas chamber and a second pressurized gas chamber, the diffusion chamber arranged between the first and the second pressurized gas chambers, the first actuator arranged for opening both of the first and the second pressurized gas chambers.

5. The gas generator according to claim 1, wherein the deflector is arranged so as to be pushed by the gases diffused by the communication surface in order to pass from the first position to the second position.

6. The gas generator according to claim 1, wherein the second actuator is a pyrotechnic igniter and in that the pyrotechnic igniter is arranged so as to deform the deflector from the first position to the second position.

7. The gas generator according to claim 1, wherein the second actuator is connected to the airbag.

8. The gas generator according to claim 7, wherein the deflector has a shape of a strip positioned around the diffusion chamber and in that ends of the strip are connected together through a breakable element.

9. The gas generator according to claim 1, wherein the deflector has a shape of a strip laid out around the diffusion chamber and ends of the strip are connected together in order to form a lock of the strip around the diffusion chamber.

10. The gas generator according to claim 9, wherein the obturator includes a piston arranged so as to lock together a first and a second end of the strip, attached to the first end of the strip, and arranged so as to be press fitted into the second end of the strip.

11. The gas generator according to claim 10, wherein the second actuator is laid out in order to push the piston out of the second end.

12. A gas generator for an airbag comprising:
   at least one pressurized gas chamber;
   a first actuator for opening the gas pressurized gas chamber;
   a diffusion chamber including a communication surface arranged for diffusing gases from the at least one pressurized gas chamber towards the airbag;
   an obturator located outside the diffusion chamber and including a second actuator, the obturator arranged so as to be locked in a first position in which the obturator and the communication surface cooperate to define a first diffusion surface area;
   a deflector having a shape of a strip positioned around the diffusion chamber, and ends of the strip connected together through a breakable element;
   wherein the second actuator is arranged for unlocking the obturator in order to allow the obturator to go into a second position in which the obturator and the communication surface cooperate to define a second diffusion surface area greater than the first diffusion surface area;
   wherein the second actuator is connected to the airbag.

13. A gas generator for an airbag comprising:
   at least one pressurized gas chamber;
   a first actuator for opening the gas pressurized gas chamber;
   a diffusion chamber including a communication surface for diffusing gases from the at least one pressurized gas chamber towards the airbag; and an obturator including a deflector, the obturator operative in first and second positions such that in the first position the deflector partly covers the communication surface and the obturator cooperates with the communication surface for defining a first diffusion surface area and in the second position the obturator and the communication surface cooperate to define a second diffusion surface area greater than the first diffusion surface area;
   further comprising the deflector having a shape of a strip and positioned around the diffusion chamber; and,
   wherein ends of the deflector are connected together through a breakable element.

14. The gas generator of claim 13, further comprising a second actuator for unlocking the obturator in order to allow the obturator to go into the second position.

15. The gas generator of claim 13, wherein the obturator is located outside the diffusion chamber.

* * * * *